W. L. REEVES.
ATTACHMENT FOR PLOWS.
APPLICATION FILED JUNE 5, 1914.
1,169,285.
Patented Jan. 25, 1916.
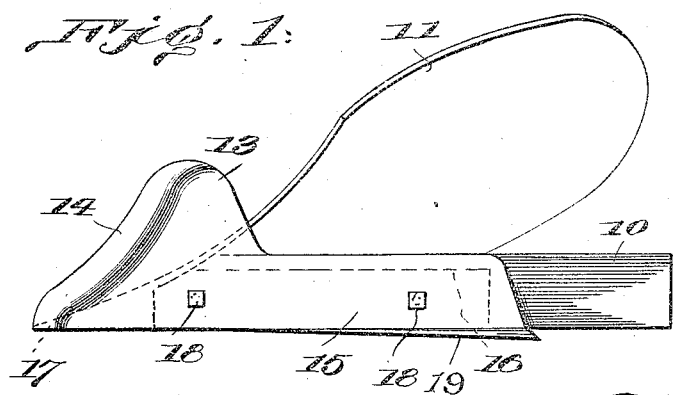
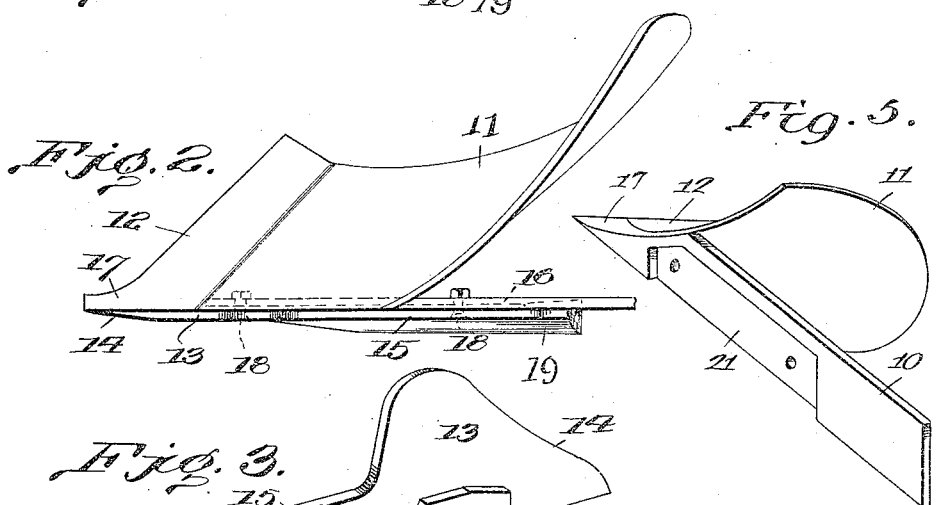
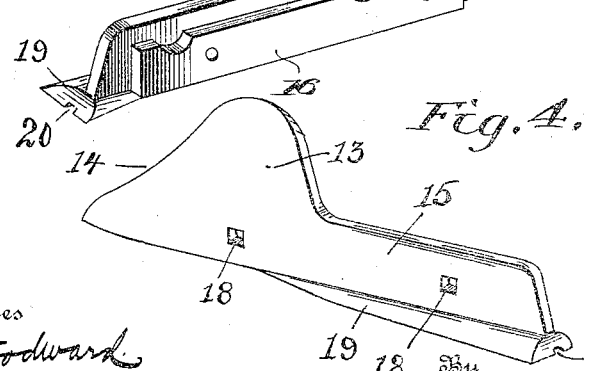
Inventor
W. L. Reeves
Witnesses
C. N. Woodward
Jno Twine
By
H. W. Lacey, Attorneys

UNITED STATES PATENT OFFICE.

WESLEY L. REEVES, OF TYLER, TEXAS.

ATTACHMENT FOR PLOWS.

1,169,285.  Specification of Letters Patent.  Patented Jan. 25, 1916.

Application filed June 5, 1914. Serial No. 843,237.

*To all whom it may concern:*

Be it known that I, WESLEY L. REEVES, a citizen of the United States, residing at Tyler, in the county of Smith and State of Texas, have invented certain new and useful Improvements in Attachments for Plows, of which the following is a specification.

This invention relates to improvements in attachments for plows for the purpose of cutting roots, sods, and the like, and has for one of its objects to provide a simply constructed attachment which not only provides a suitable cutting implement but likewise includes a removable landside.

With these and other objects in view the invention consists in certain novel features of construction as hereinafter shown and described and then specifically pointed out in the claims; and in the drawings illustrative of the preferred embodiment of the invention. Figure 1 is a side elevation of the landside base and the moldboard of a plow viewed from the land side. Fig. 2 is a plan view of the parts shown in Fig. 1. Fig. 3 is a perspective view of the attachment detached and viewed from the inner face. Fig. 4 is a perspective view of the attachment detached and viewed from the outer face. Fig. 5 is a detached perspective view of the main landside, illustrating its construction.

Corresponding and like parts are referred to in the following description and indicated in all the views of the drawings by the same reference characters.

The improved device may be applied without structural change to plows of various makes and forms, and it is not desired therefore to limit the invention for use in connection with any particular form of plow. For the purpose of illustration the improved device is shown applied to a conventional landside base and moldboard of a plow, the landside base being represented conventionally at 10, the moldboard at 11, and the share at 12, these parts being of the usual construction and connected in the usual manner.

The improved device comprises a plate enlarged at one end, as shown at 13, and with a rearwardly and upwardly inclined cutting edge 14 and with a reduced rear portion 15. The plate is designed to displace the ordinary removable landside portion of a plow and to be disposed in its place, the reduced extension 15 having an enlargement 16 upon its rear face to engage in the socket or depression 21 in the outer face of the base portion 10. The enlargement 16 conforms to the similar enlargement formed upon the ordinary removable landside of the plow, and will be varied to conform to plows of various makes. The plate 13 thus bears closely against the landside of the plow and the landside terminal of the share 12. At its forward terminal the cutting edge 14 corresponds to the nose portion 17 of the share, and rises for a considerable distance above the backwardly inclined rear of the share and moldboard, as illustrated in Fig. 1, and thus forms an efficient cutter constantly disposed above the line of the share and likewise in advance of the lower or forward portion of the moldboard. The extension 15 is provided with bolt apertures to receive the clamp bolts as indicated at 18, the bolt apertures corresponding to the ordinary bolt apertures of the landside base, so that the same apertures 18 are utilized to receive the ordinary holding bolts of the landside.

The plate 13 and the extension 16 are preferably integral, but may be formed of separate parts if preferred, and may be drop-forged or otherwise produced and the cutting edge highly tempered to withstand the strains to which it will be subjected. The inclined side of the cutting edge is presented outwardly, as shown in Fig. 2, so that the plate may be sharpened, if preferred, without removal.

At its lower edge the member 15 is provided with a downwardly and rearwardly sloping shoe as represented at 19, and preferably with a longitudinal channel 20 in its lower face. By this means the grip of the shoe upon the bottom of the furrow is materially increased, and the movement steadied and rendered more easy to control.

The improved device is simple in construction, can be inexpensively manufactured and adapted, as before stated, without material structural change to plows of various makes and sizes.

Having thus described the invention, what is claimed as new is:—

1. The combination with a plow including a landside having a socket closed at the ends and at the upper side and opening downwardly and laterally, a cutter device having a rearward extension bearing against said landside, a lateral projection upon said cutter extension and engaging in the socket of the landside whereby the cutter and its extension are supported from upward and longitudinal movement relative to the landside, and fastening devices connecting said cutter extension and its projection to the landside.

2. The combination with a plow including a landside having a socket closed at the ends and at the upper side and opening downwardly and laterally, a cutter device having a rearward extension bearing against said landside and having a lateral projection engaging in the socket of the landside whereby the cutter and its extension are supported from upward and longitudinal movement relative to the landside, fastening devices connecting said cutter extension and its projection to the landside, and a bearing shoe upon the lower edge of the cutter extension projecting laterally therefrom and sloping rearwardly and downwardly.

3. As a new article of manufacture, a combined cutter and landside attachment comprising a body extended vertically at the forward end, the forward extension having a cutting edge and the rear portion formed with a bearing shoe projecting laterally therefrom and sloping rearwardly and downwardly, said shoe having a longitudinal channel in its bearing face.

In testimony whereof I affix my signature in presence of two witnesses.

WESLEY L. REEVES. [L. S.]

Witnesses:
J. M. STEPHENS,
QUINN MOBAN.

Copies of this patent may be obtained for five cents each, by addressing the "Commissioner of Patents, Washington, D. C."